(No Model.)
C. D. STEVENS.
METALLIC ROD PACKING.
No. 264,580. Patented Sept. 19, 1882.
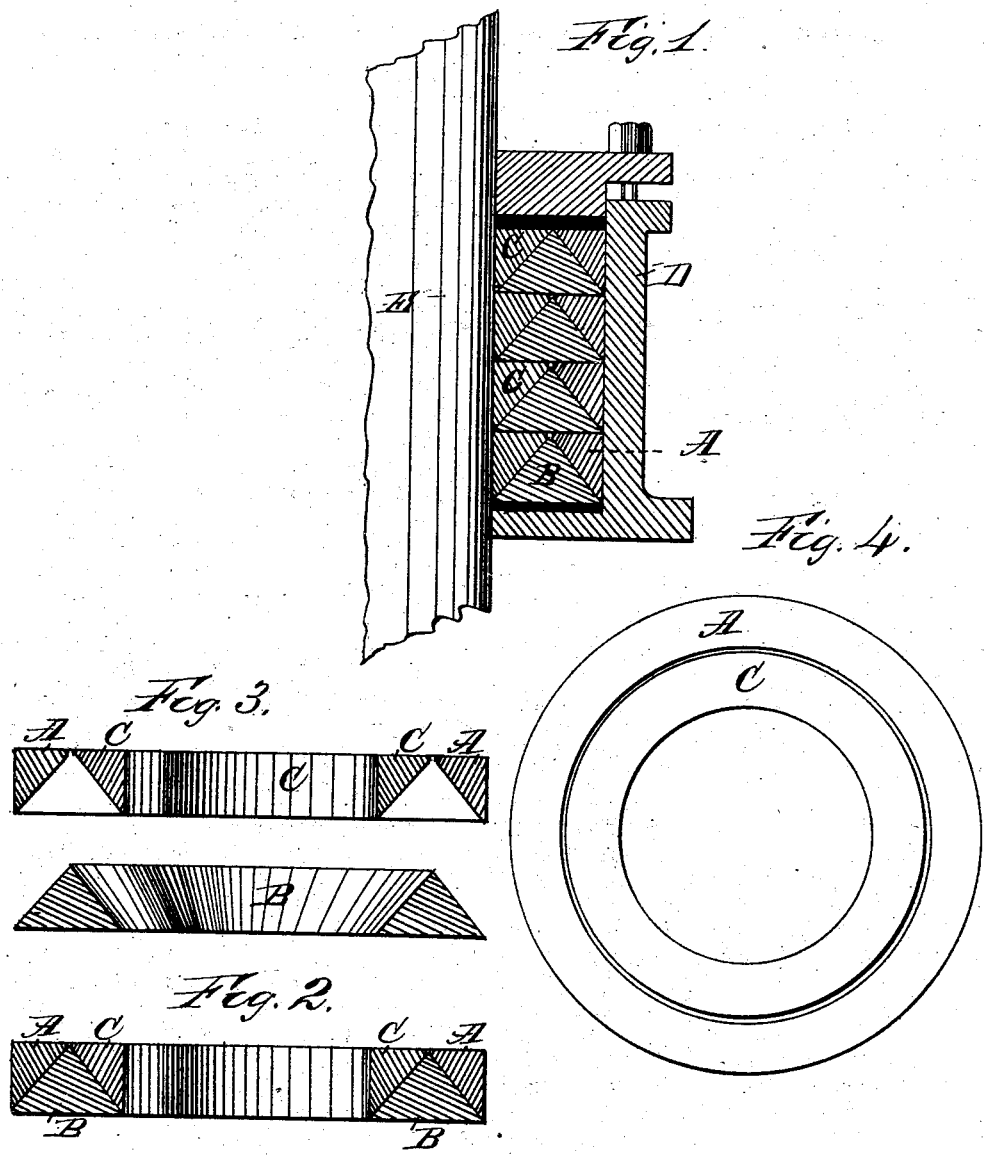
WITNESSES:
INVENTOR.

UNITED STATES PATENT OFFICE.

CHARLES D. STEVENS, OF BROOKLYN, NEW YORK.

METALLIC ROD-PACKING.

SPECIFICATION forming part of Letters Patent No. 264,580, dated September 19, 1882.

Application filed August 11, 1882. (No model.)

*To all whom it may concern:*

Be it known that I, CHARLES D. STEVENS, of the city of Brooklyn, county of Kings, New York, have invented a new and useful Improvement in metallic packing for stuffing-boxes for piston-rods of steam-engines and like purposes, of which the following is such full, clear, and exact description as will enable those skilled in the art to which it appertains to make and use the same when taken in connection with the accompanying drawings, in which—

Figure 1 is a sectional view of the packing as applied in a packing-box. Fig. 2 is a cross-section of the rings together. Fig. 3 is a cross-section of the rings separated. Fig. 4 is a top view of the rings shown in Fig. 2.

The packing is composed of three separate rings, A B C, of which the ring A is the largest, and fits snugly within the packing-box; C is the smallest, and fits snugly around the rod; and B is a ring, wedge-shaped in cross-section, which fits between the two rings A and C. The outside ring, A, is made with its outside edge straight, so as to fit against the packing-box D, in which the packing is placed, and its inside edge sloping or beveled, so as to fit the outer edge of the wedge-shaped ring B. The inside ring, C, is made with its outer edge sloping or beveled, so as to fit the inner edge of the wedge-shaped ring B, and its inside edge is made flat, so as to fit close around the piston-rod E, to which it is applied. The greatest diameter of the outside of the inside ring, C, is equal to the smallest diameter of the inside of the outside ring, A. The wedge-shaped ring B is of such form that its two edges are beveled to coincide with the beveled edges of the rings A and C, and of such a size that the inside ring, C, cannot pass through sufficiently to permit the ends of the two rings to correspond, and cannot pass through the outside ring, A, sufficiently to permit the ends of these two rings to correspond, so that it has a wedge-like action on the inside and outside rings. The rings are made of brass or other alloy, or preferably of Babbitt metal or like metal. Before applying the rings to the box they should each be cut in two, so as to form half-rings of them, and so applied as to break joint with one another. In applying the rings the wedge-shaped ring B is placed in the box with its beveled edges uppermost, as shown in Fig. 1, and the rings A and C are placed thereon, their beveled edges downward, so that the wedge-shaped ring B comes between the rings A and C, so that when pressure is applied the wedge-shaped ring B is forced between the two rings A and C and they are forced apart, the outside ring, A, against the packing-box and the inside ring, C, against the piston-rod. Three rings, A, B, and C, form a set, and as many sets may be used in a packing-box as will fill or nearly fill it. They are placed in the box in successive order, as shown in Fig. 1, or every other set may be reversed, so that the wedge-shaped ring of that set will be next the wedge-shaped ring of the next set.

At either or both ends of the packing-box may be placed a small piece of rubber or similar packing to give elasticity to the metal packing contained between it.

I am aware that packing has been made consisting of metal rings, each having a beveled face, which fits to the beveled face of another ring, one of which rings on its outside fits the box and the other on its inside fits the rod, so arranged as to be expanded by the action of the beveled faces when pressure is applied at the end of the box.

The advantages of my packing over all others is that a greater pressure is exerted by the inside rings inward and by the outside rings outward for the same force applied than by any other form of rings, on account of the greater acuteness of the wedge-piece than can be given the rings by a simple bevel.

The wedge-shaped rings B may be made of steel or hard metal, and the outside and inside rings, A and C, of Babbitt metal or like material, as it does not come in contact with either the box or the rod.

What I claim as new, and desire to secure by Letters Patent, is—

The combination, in metal packing, of an outside ring having a beveled inside edge, an inside ring having a beveled outside edge, and a wedge-shaped ring fitted between them, substantially as specified and set forth.

CHAS. D. STEVENS.

Witnesses:
G. G. FRELINGHUYSEN,
JOSEPH J. SULLIVAN.